United States Patent [19]

Eimaeda et al.

[11] Patent Number: 4,790,486
[45] Date of Patent: Dec. 13, 1988

[54] PROCESS FOR PREPARATION OF PAPER-MAKING HYDROUS SILICIC ACID FILLER

[75] Inventors: Shigeru Eimaeda; Kunihiko Aida; Shinji Seto; Takao Suzuki, all of Tomakomai, Japan

[73] Assignee: Oji Paper Company, Ltd., Tokyo, Japan

[21] Appl. No.: 926,707

[22] Filed: Oct. 31, 1986

[51] Int. Cl.$^4$ ............................................. B02C 19/12
[52] U.S. Cl. ...................................... 241/20; 241/21; 241/24; 241/29; 106/492
[58] Field of Search ..................... 241/29, 24, 20, 21, 241/80, 97; 106/287.34, 288 B

[56] References Cited

U.S. PATENT DOCUMENTS 3,716,493 2/1973 Acker et al. ................ 106/288 B X

FOREIGN PATENT DOCUMENTS 17158 5/1973 Japan ..................................... 241/21

Primary Examiner—Mark Rosenbaum
Attorney, Agent, or Firm—Armstrong, Nikaido, Marmelstein & Kubovcik

[57] ABSTRACT

An improved paper-making hydrous acid filler is prepared by classifying or pulverizing a slurry containing fine particles of hydrous silicic acid, which is obtained by neutralizing sodium silicate with sulfuric acid, by a wet classifier or a wet pulverizer, so that the proportion of particles having a particles size of 1 to 30 μm is at least 80% and the proportion of particles having a particle size of at least 70 μm is not more than 0.4%. The filler has a function of improving the ink receptivity of the paper of the internal additive type and is capable of improving the opacity of the paper after printing.

11 Claims, 2 Drawing Sheets

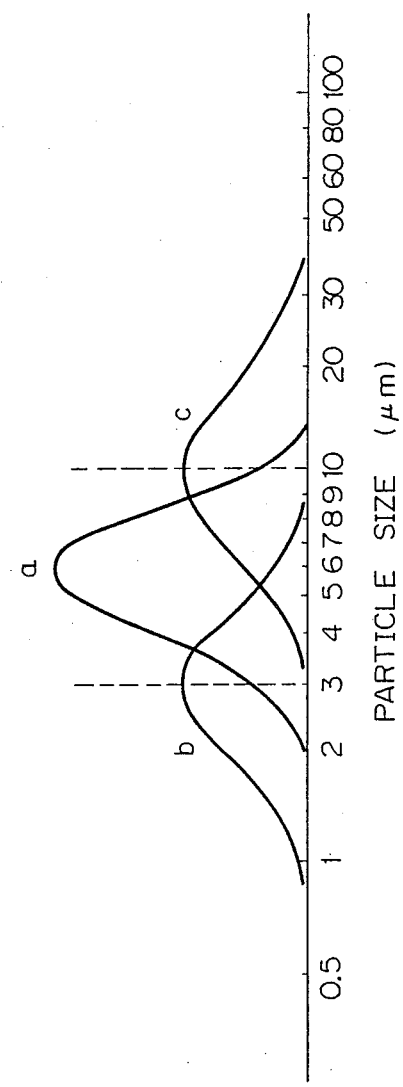

PROCESS FOR PREPARATION OF PAPER-MAKING HYDROUS SILICIC ACID FILLER

BACKGROUND OF THE INVENTION (1) Field of the Invention

The present invention relates to a process for the preparation of hydrous silicic acid to be used as a filler for paper.

(2) Description of the Related Art

Recently, the basis weight of paper has decreased, but if the basis weight of paper is decreased, the opacity is undesirably reduced upon printing. As a means of preventing this reduction of the opacity of paper after printing, there is ordinarily adopted a method in which a filler is added to the paper. Various inorganic and organic fillers have been proposed and developed, but even at the present, a cheap filler having satisfactory effects is not available. Furthermore, not only a prevention of a reduction of the opacity after printing but also an improvement of the quality of the printed surface, especially the ink receptivity, is now strongly desired.

Among various fillers, a silicic acid filler is cheaper and has higher effect of imparting opacity upon printing. However, the effect of this filler is not high because of an unsatisfactory retention thereof in the paper and a reduced ink receptivity of the paper.

A process for the preparation of hydrous silicic acid preferred as a paper filler and a process for the preparation of a hydrous silicic acid slurry for preventing a print-through of the paper are disclosed in Japanese Examined Patent Publications No. 49-36877, No. 52-28754, and No. 52-28755, and Japanese Unexamined Patent Publication No. 55-113611. However, when paper is manufactured from a pulp slurry in which a product prepared by the known process as mentioned above is incorporated, the filler is dislodged during the papermaking operation and is deposited on a meter of a paper machine such as a moisture meter or a caliper, and when the formed paper is printed, the filler is dislodged and adheres to a printing plate of a printer and has a fatal defect of shortening the life of the printing plate. Furthermore, the above-mentioned filler is not capable of improving the ink receptivity of the paper.

SUMMARY OF THE INVENTION

Under this background, it is a primary object of the present invention to provide a filler to which an effect unpossessed by commercially available hydrous silicic acid fillers, that is, a function of improving the ink receptivity of the paper of the internal additive type, is given and which is capable of improving the opacity after printing.

In accordance with the present invention, there is provided a process for the preparation of a paper-making hydrous silicic acid filler, which comprises classifying or pulverizing a slurry containing fine particles of hydrous silicic acid, which is obtained by neutralizing sodium silicate with sulfuric acid, by a wet classifier or a wet pulverizer, so that the proportion of particles having a particle size of 1 to 30 μm is at least 80% and the proportion of particles having a particle size of at least 70 μm is not more than 0.4%, preferably not more than 0.05%.

Namely, according to the present invention, there is provided a hydrous silicic acid slurry having a specific particle size distribution, which is obtained under specific preparation conditions. This hydrous silicic acid slurry is used as it is as a filler for the paper, and the present invention is advantageous not only in that a cheap filler can be prepared very easily and stably but also in that the obtained hydrous silicic acid filler has an excellent retention in the paper, the ink receptivity at the step of printing paper is improved, and the effect of improving the opacity after printing is attained.

DESCRIPTION OF THE PREFERRED EMBODIMENTS

Figure 1:
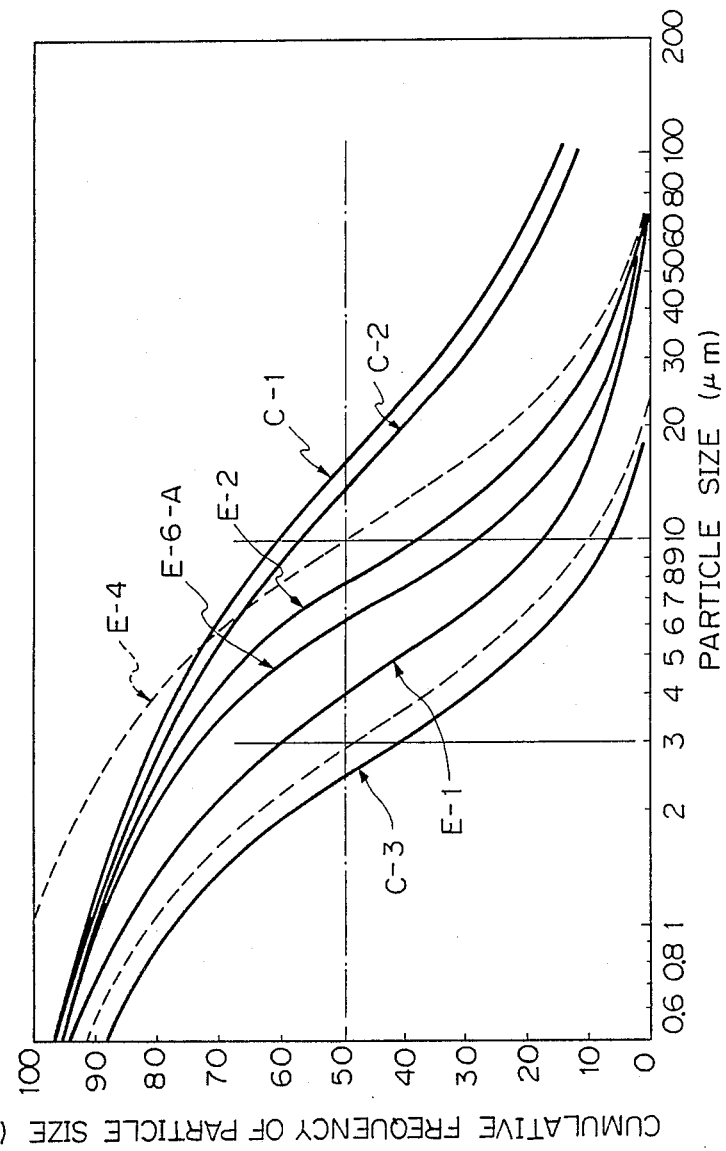
FIG. 1 is a diagram illustrating the cumulative frequencies of particle sizes of typical products obtained in the Examples and Comparative Examples; and, FIG. 2 is a conceptual diagram illustrating a preferred particle size distribution and particle size distributions of the upper limit and lower limit.

The present invention will now be described in detail.

A hydrous silicic acid slurry prepared according to a known method can be used as the starting hydrous silicic acid slurry in the present invention. For example, a slurry formed by incorporating water into a commercially available powdery product of silicic acid and a silicic acid product supplied in the form of a slurry can be used. However, the former slurry is expensive in the cost and the quality of the product is inferior. Accordingly, preferably a slurry product is used as the starting material, most preferably hydrous silicic acid slurry obtained by neutralizing sodium silicate with sulfuric acid, because the cost is lowest.

In the present invention, the hydrous silicic acid slurry must be wet-classified and/or wet-pulverized so that the proportion of particles having 1 to 30 μm is at least 80% and the proportion of particles having a particle size of at least 70 μm is not more than 0.4%, preferably not more than 0.05%. A hydrous silicic acid slurry prepared according to the known technique has an average particle size of 20 to 100 μm and the proportion of particles having a size of at least 70 μm is 5 to 20%, and commercially available hydrous silicic acid prepared by filtering, drying, and pulverizing and/or classifying this slurry contains about 0.5% of particles having a particle size of at least 70 μm.

When this silicic acid containing coarse particles having a particle size larger than 70 μm is added to a paper composition and paper is made therefrom, coarse particles separate from the wire screen and adhere to meters provided in a paper-making machine and put these meters out of order. Furthermore, when the formed paper is printed, coarse particles dislodged from the paper adhere to the printing plate of a printing machine and are deposited thereon to bring about an extremely adverse shortening of the life of the printing plate. Accordingly, the proportion of such coarse particles must be reduced. Even if the proportion of the coarse particles is small, when the addition ratio of the filler is increased or the operation is continued for a long time, the coarse particles are accumulated and the adverse influences increased. The proportion of the coarse particles must be reduced below 0.4% based on the entire filler, preferably below 0.05%, especially preferably, substantially to zero, by classification and/or pulverization.

Where wet pulverization is carried out to remove coarse particles having a particle size of at least 70 μm, the particles sometimes may be pulverized to particles having a particle size smaller than 1 μm. Since these fine particles having a particle size smaller than 1 μm have a poor retention in the paper, the effects of improving the opacity after printing and the ink receptivity are low. Accordingly, the pulverizer and pulverizing conditions must be selected so that the proportion of particles having a particle size smaller than 1 μm is not increased.

In the present invention, preferably the average particle size is within the range of from 3 to 10 μm.

To our great surprise, it was found that the hydrous silicic acid slurry has an excellent effect of improving the ink receptivity, although a commercially available powdery product of hydrous silicic acid or a product of hydrous silicic acid prepared according to the known method is not effective for improving the ink receptivity at all. If the average particle is smaller than 3 μm or larger than 10 μm, the above-mentioned effect is not attained, and the effect is highest if the average particle size is within the range of from 3 to 10 μm. It has been found that, among this range, the optimum average particle size differs according to the kind and freeness of the pulp used.

The mechanism of improving the ink receptivity by internal addition of the filler has not been completely elucidated, but it is ordinarily considered that the ink receptivity is influenced by the smoothness of the paper and the pore size distribution on the paper surface. Namely, it is considered that the higher the smoothness of the paper or the larger the number of pores having a size smaller than 1.5 μm, the higher the ink receptivity. In paper in which hydrous silicic acid is incorporated, as compared with paper formed solely of pulp fibers, it is considered that particles of hydrous silicic acid are embedded in relatively large empty spaces formed by an entanglement of surface fibers to improve the smoothness, and the size of new spaces (micro pores) formed by the embedded particles and the fibers is reduced below 1.5 μm to improve the ink receptivity. Since the size of the spaces (micro pores) formed among the pulp fibers differs according to the kind and shape of the pulp used, it is considered that the size of the internally added filler, which is optimum for embedding these spaces to form new fine pores having a size smaller than 1.5 μm, differs.

The reasons why powdery hydrous silicic acid or hydrous silicic acid once dried during the preparation does not have the capacity to improve the ink receptivity is considered to be that, where silicic acid is once dried, the bonding force (hydrogen bond) to the cellulose pulp fibers by the silanol group (—SiOH) present on the surface is reduced and the silanol group is polycondensed to form a siloxane bond —Si—O—Si—.

In carrying out the present invention, preferably a wet classifier and a wet pulverizer are used in combination.

More specifically, in a preferred method, the hydrous silicic acid slurry is pulverized by a wet pulverizer; the pulverization product is classified into particles (A) having a size not larger than 30 μm and particles (B) having a size larger than 30 μm by a wet classifier; the particles (B) having a size larger than 30 μm are pulverized by the same or a different wet pulverizer to obtain particles (C) predominantly having a size not larger than 30 μm; and the particles (B) and the particles (C) are combined together.

In another preferred method, the hydrous silicic acid slurry is classified into particles (D) containing a salient amount of particles having a size of at least 70 μm, and particles (E) substantially not containing particles having a size of at least 70 μm, by a wet classifier; the particles (D) are pulverized by a wet pulverizer and then classified by the same or different wet classifier to obtain particles (F) having a size not larger than 30 μm; and the particles (E) and the particles (F) are combined together. If desired, the particles (E) may be further treated with the wet classifier before combining them with the particles (F).

The kind of wet classifier is not particularly critical. For example, there can be used a sedimentation classifier, a liquid cyclone, a vibrating screen, an inclined screen, and other customary classifiers. These classifiers may be used singly or in combination.

The kind of wet pulverizer is not particularly critical. For example, there can be used customary wet pulverizers such as a continuous homogenizing mixer, a colloid mill, a disk refiner, a sand grinder, a ball mill, and a rod mill.

The method for measuring the particles size distribution and the ink receptivity will now be described.

(PARTICLE SIZE DISTRIBUTION

Particles having a particle size larger than 44 μm (325 mesh) are determined by the water sieving method in which JIS standard sieves are stacked and water is caused to flow from above under vibration by a vibration machine. Particles having a particle size not larger than 44 μm are determined by a Shimazu centrifugal sedimentation particle distribution measuring apparatus. The average particles size is expressed by the central cumulative value (median diameter).

(INK RECEPTIVITY)

Solid printing is carried out by a Miyakoshi M-3 type printer, and the ratio of transfer of an ink on the printing plate to the paper is measured, and it is judged that the higher the ink transfer ratio, the better the ink receptivity.

The ink transfer ratio X is defined by the following formula and a comparison is made of the values obtained when the amount of the ink is a certain amount (2.5 g/m$^2$):

$$X = (A/B) \times 100 (\%)$$

wherein A stands for the amount (g/m$^2$) of the ink transferred to the print and B stands for the amount (g/m$^2$) of the ink on the printing plate before printing.

The invention will be described in detail by the following examples and comparative examples.

REFERENTIAL EXAMPLE

An internal heating type reactor having an inner capacity of 300 l and provided with a stirrer was charged with 53.5 l of an aqueous solution of sodium silicate (SiO$_2$/Na$_2$O molar ratio=3.05, SiO$_2$ concentration=187 g/l), formed by dissolving commercially available solid water glass, and 170 l of an aqueous solution of Glauber's salt (having a concentration of 3.9%). Then, the temperature was elevated to 45° C. by steam heating, and 8.7 l of sulfuric acid having a concentration of 20% by weight (about 228 g/l) was added over a period of about 10 minutes with stirring. The ratio of the amount of sulfuric acid added at the first stage to the total amount of sulfuric acid was 38%.

After termination of the first stage addition of sulfuric acid, steam was blown into the reaction mixture with stirring and the temperature was elevated to 95° C. over a period of 20 minutes. The reaction mixture was maintained at this temperature for 10 minutes and about 14 l of remaining sulfuric acid was added over a period of 90 minutes. The addition was terminated when the pH value became 5, whereby a hydrous silicic acid slurry for the manufacture of paper was obtained. The hydrous silicic acid slurry was filtered with filter paper No. 2 supplied by Toyo Roshi, and the filter cake was washed with water and then dried at 105° C. for about 4 hours until a change in the weight was not observed. The concentration of hydrous silicic acid in the slurry was 3.7%, and the particle size distribution of this hydrous silicic acid was such that the proportion of particles having a particle size of at least 70 μm was 19.8% and the average particle size was 16.2 μm.

COMPARATIVE EXAMPLE 1

To 2 l of a pulp slurry containing 25 g/l of a mixed pulp for newsprint paper was added 27 ml of the hydrous silicic acid slurry obtained in the Referential Example, so that the amount of hydrous silicic acid was 2% based on the weight of the bone dry pulp. The mixture was stirred for 2 minutes, and $Al_2(SO_4)_3 \cdot 18H_2O$ (aluminum sulfate) was added in an amount of 1% based on the pulp and the mixture was stirred for 2 minutes. The mixture was diluted with water so that the entire amount was 16 l. The composition was sufficiently remixed and was made into paper having a basis weight of 42.5 g/m² by a TAPPI standard square sheet machine. The formed paper was stabilized at a temperature of 20° C. and a relative humidity of 65% and passed through a machine calender having a linear pressure of 40 kg/cm so that the smoothness of the paper was adjusted to 50 to 60 seconds. Then, solid printing was carried out over an area of 13.9 cm×18 cm with an ink for letterpress printing by using a Miyakoshi M-3 type printing machine. Many white specks having a diameter of about 0.3 to about 0.05 mm were present on the printing plate after printing, which indicates that particles of the filler in the paper were transferred to the printing plate in an amount of 2 to 5 particles per square centimeter.

The obtained results are shown in Table 1.

The opacity X(%) upon printing, shown in the table, was defined by the following formula:

$$X(\%) = (A/B) \times 100$$

wherein A stands for the reflectance of the back surface after printing and B stands for the reflectance of the back surface before printing.

COMPARATIVE EXAMPLE 2

On a filter cloth of a bucket type centrifugal dehydrator, 20 l of the hydrous silicic acid obtained in the Referential Example was placed and dehydrated to obtain about 5 kg of a hydrous silicic acid cake. The entire cake was added to 5.2 l of an unhydrated silicic acid slurry (having an $SiO_2$ concentration of 3.7%), and the mixture was sufficiently stirred by a stirrer to obtain 9.33 l of a hydrous silicic acid slurry having a concentration of 100 g/l. The slurry was lightly treated by a continuous homogenizing mixer. The treated slurry had a particle size distribution such that the proportion of particles having a particle size of at least 70 μm was 16.3% and the average particle size was 14.6 μm. In the same manner as described in Comparative Example 1, 10 ml of this slurry was added to a pulp slurry for newsprint paper and paper was made, and the printing test was carried out on the obtained paper.

The obtained results are shown in Table 1. As in Comparative Example 1, the opacity after printing was improved but the ink transfer ratio was not improved at all, and the white filler adhered to the printing plate after printing and the printing plate was found to be contaminated.

COMPARATIVE EXAMPLE 3

5 l of the hydrous silicic acid obtained in the Referential Example was pulverized by passing it through a pulp-disintegrating disk refiner (12-inch SW type refiner supplied by Kumagai Riki, 30 kW, 3600 rpm) three times with a clearance of 0.02 mm.

In the pulverized slurry, the proportion of particles having a particle size of at least 70 μm was 0.02%, the proportion of particles having a particle size of 1 to 30 μm was 77%, and the average particle size was 2.5 μm. In the same manner as in Comparative Example 1, the slurry was added to the pulp slurry for newsprint paper so that the amount of the hydrous silicic acid filler was 2% based on the pulp, paper was made, and the printing test was carried out on the obtained paper. The obtained results are shown in Table 1. Contamination of the printing plate with the filler was not observed, but the retention of the filler was low and the effects of improving the opacity after printing and the ink transfer ratio were poor.

For comparison, the results of the blank test where filler was not used and the test where commercially available white carbon (hydrous silicic acid filler supplied by Tokuyama Soda) was added in an amount of 2% based on the pulp are shown in Table 1.

TABLE 1

|  | (%) Proportion of particles having size of at least 70 μm | (%) Proportion of particles having size of 1 to 30 μm | (μm) Average particle size | (%) Retention of filler | (%) Opacity after printing | (%) Ink transfer ratio | Dislodgement of filler (contamination of plate) |
|---|---|---|---|---|---|---|---|
| Comparative Example 1 | 19.8 | 59 | 16.2 | 61.6 | 92.3 | 51.4 | Observed |
| Comparative Example 2 | 16.3 | 61 | 14.6 | 60.3 | 92.1 | 51.2 | Observed |
| Comparative Example 3 | 0.02 | 77 | 2.5 | 34.9 | 90.6 | 51.4 | Not observed |
| Commercially available product | 0.60 | 82 | 6.0 | 44.5 | 91.4 | 51.3 | Very slight |
| Blank | — | — | — | — | 88.7 | 51.4 | — |

EXAMPLE 1

In the same manner as in Comparative Example 3, the hydrous silicic acid slurry obtained in the Referential Example was pulverized by passing it once through the disk refiner with a clearance of 0.05 mm. In the pulverized slurry, the proportion of particles having a size of 1 to 30 μm was 80.5%, the proportion of particles having a size of at least 70 μm was 0.3%, and the average particle size was 4.1 μm. The results are shown in Table 2.

In the same manner as described in Comparative Example 1, the treated slurry was added as the hydrous silicic acid filler to the mixed pulp slurry for newsprint paper so that the amount of the filler was 2% based on the pulp, and paper was made and the printing test was carried out on the obtained paper. The obtained results are shown in Table 2. Contamination of the printing plate with the filler was not observed, and it was found that the opacity after printing and the ink transfer ratio were improved.

For comparison, the results of the blank test where a filler was not added and the test where commercially available white carbon was added in an amount of 2% based on the pulp are shown.

EXAMPLE 2

In the same manner as described in Comparative Example 2, the hydrous silicic acid slurry obtained in the Referential Example was dehydrated to obtain 15 kg of a hydrous silicic acid cake. Water was added to 15 kg of the cake so that the entire amount was 25 l, whereby a slurry having a hydrous silicic acid concentration of about 90 g/l was obtained. The slurry was jetted on a wedge wire screen (supplied by Toyo Screen, screen width=280 mm) having a mesh size of 68 μm under a jetting pressure of 1.5 kg/cm² at a slurry feed rate of 30 l/min. The amount of the liquid passing through the screen was about 12 l, and a slurry was obtained in which the concentration was about 80 g/l, the proportion of particles having a size of 1 to 30 μm was 84.0%, the content of particles having a size of at least 70 μm was 0.02%, and the average particle size was 8 μm.

In the same manner as described in Comparative Example 1, 12.5 ml of the slurry was added to 50 g, as the bone dry weight, of the mixed pulp for newsprint paper (2% of the hydrous silicic acid filler based on the pulp), paper was made, and the printing test was carried out on the obtained paper. The obtained results are shown in Table 2.

The obtained results were substantially the same as those obtained in Example 1.

EXAMPLE 3

About 13 l of the slurry flowing on the wedge wire screen without passing therethrough in Example 2, which had a concentration of about 99 g/l, was pulverized with a clearance of 75 μm by a colloid mill (TK Micolloider Model S supplied by Tokushu Kika Kogyo) over a period of about 2 minutes. In the treated slurry, the proportion of particles having a size of 1 to 30 μm was 80.0%, the proportion of particles having a size of at least 70 μm was 0.05% and the average particle size was 3.6 μm.

In the same manner as described in Comparative Example 1, 10 ml of the slurry was added to the starting slurry for newsprint paper (the amount of the hydrous silicic acid was 2% by weight based on the pulp), paper was made, and the printing test was carried out on the obtained paper. The obtained results are shown in Table 2.

The obtained results were substantially the same as those obtained in Examples 1 and 2.

EXAMPLE 4

200 ml of the hydrous silicic acid slurry obtained in the Referential Example was poured into a 200-mesh JIS standard sieve having a diameter of 20 cm and classification was effected by shaking the sieve strongly by hand, and about 800 ml of water was gradually added on the sieve to sufficiently drop fine particles, whereby about 1 l of a hydrous silicic acid slurry free of coarse particles having a size larger than 70 μm was recovered in a vessel arranged under the sieve. The slurry was charged in a graduated cylinder having a capacity of 1 liter and the slurry was allowed to stand at room temperature for about 10 hours. Then, about 25 ml of the sedimented silicic acid slurry was collected from the lowermost portion and was diluted to 200 ml. The concentration of the slurry was 1.7%, the proportion of particles having a size of 1 to 30 μm was 88%, the proportion of particles having a size of at least 70 μm was substantially zero, and the average particle size was 9.7 μm.

In the same manner as described in Comparative Example 1, 58.8 ml of the slurry was collected and added to the pulp slurry for newsprint paper so that the amount of the filler was 2% based on the pulp, paper was made, and the printing test was carried out.

The obtained results are shown in Table 2. Contamination of the printing plate with the filler was not observed, the retention of the filler was improved, and the opacity after printing and the ink transfer ratio were also improved.

TABLE 2

|  | (%) Proportion of particles having size of at least 70 μm | (%) Proportion of particles having size of 1 to 30 μm | (μm) Average particle size | (%) Retention of filler | (%) Opacity after printing | (%) Ink transfer ratio | Dislodgement of filler (contamination of plate) |
| --- | --- | --- | --- | --- | --- | --- | --- |
| Example 1 | 0.30 | 80.5 | 4.1 | 44.3 | 92.0 | 52.9 | Not observed |
| Example 2 | 0.02 | 84.0 | 8.0 | 45.0 | 92.1 | 52.7 | Not observed |
| Example 3 | 0.05 | 80.0 | 3.6 | 44.0 | 91.9 | 52.8 | Not observed |
| Example 4 | 0 | 88.0 | 9.7 | 48.3 | 92.1 | 52.0 | Not observed |
| Commercially available product | 0.60 | 82.0 | 6.0 | 42.0 | 91.6 | 51.5 | Very slight |
| Blank | — | — | — | — | 88.9 | 51.5 | — |

EXAMPLE 5

According to the same procedures as described in Example 2, a slurry was formed by adding water to a cake of hydrous silicic acid so that the concentration was adjusted to 100 g/l and the slurry was independently treated by the following three wet classifiers, and each slurry obtained as the accept was further treated by a 200-mesh vibrating screen. In the same manner as described in Comparative Example 1, each treated slurry was added to the starting material for newsprint paper, paper was made, and the printing test was carried out. The obtained results are shown in Table 3.

(A) Wedge wire screen (supplied by Ando Screen, slit opening=150 μm, natural flow-down type)

(B) Vibrating screen (supplied by Tsukishima Kikai, Model Boulton 48, 100 mesh)

(C) Liquid cyclone (centri-cleaner supplied by Bauer Co., cylinder diameter=90 mm, discharge nozzle diameter=5.6 mm, supply pressure=3 kg/cm$^2$)

EXAMPLE 6

According to the same procedures as described in Examples 2 and 5, a slurry having a concentration of 120 g/l was prepared by adding water to a cake of hydrous silicic acid, and the slurry was pulverized by a sand grinder (Sand Grinder Model 32G supplied by Igarashi Kikai) and four products A, B, C, and D were prepared by changing the rotation velocity (500 to 740 rpm), the kind of pulverizing medium (glass beads having a diameter of 1.0 to 4.5 mm), the quantity of the pulverizing medium (50 to 75 kg), and the slurry feed rate (5 to 60 l/min). Each of these products was treated by a 200-mesh vibrating screen to remove coarse particles. Then, in the same manner as described in Comparative Example 1, the slurry was added to the starting pulp for newsprint paper so that the amount of the filler was 2% based on the pulp, and the paper was made and the printing test was carried out. The obtained results are shown in Table 3.

As is apparent from the results shown in Table 3, in each of Examples 5 and 6, contamination of the printing plate was not caused at the printing step, and the opacity after printing and the ink transfer ratio were improved.

The cumulative frequencies of particle sizes of typical instances of the products obtained in the Examples and Comparative Examples are shown in graphs of FIG. 1. Curves E-1, E-2, E-4, E-6-A, C-1, C-2 and C-3 correspond to Examples 1, 2, 4 and 6-A, and Comparative Examples 1, 2 and 3, respectively. The preferred particle size distribution defined in the claims corresponds to the region between the two broken line curves.

FIG. 2, curve a, is a conceptual diagram of the preferred particle size distribution of the present invention. Curves b and c represent the particle size distributions of the upper and lower limits of the average particles size (i.e., 3 μm and 10 μm), respectively. The practical distribution curve is not always a normal distribution curve as shown in FIG. 2, and the distribution curve shown in FIG. 2 is conceptual.

We claim:

1. A process for preparing a wet hydrous silicic acid filler used in the wet state for papermaking, consisting essentially of obtaining a slurry containing fine particles of hydrous silicic acid by neutralizing sodium silicate with sulfuric acid, and then pulverizing said slurry by use of a wet pulverizer so that the proportion of particles of hydrous silicic acid having a particle size of 1–30 μm is at least 80% and the proportion of particles of hydrous silicic acid having a particle size of at least 70 μm is not more than 0.4%.

2. A process according to claim 1, wherein the proportion of particles having a particle size of at least 70 μm is not more than 0.05%.

3. A process according to claim 1, wherein the average particle size of the resulting filler is in the range of 3 to 10 μm.

4. A process for preparing a wet hydrous silicic acid filler used in the wet state for papermaking, consisting essentially of obtaining a slurry containing fine particles of hydrous silicic acid by neutralizing sodium silicate with sulfuric acid, and then classifying said slurry by the use of a wet classifier so that the proportion of particles of hydrous silicic acid having a particle size of 1–30 μm is at least 80% and the proportion of particles of hydrous silicic acid having a particle size of at least 70 μm is not more than 0.4%.

5. A process according to claim 4, wherein the proportion of particles having a particle size of at least 70 μm is not more than 0.05%.

6. A process according to claim 4, wherein the average particle size of the resulting filler is in the range of 3 to 10 μm.

7. A process for preparing a wet hydrous silicic acid filler used in the wet state for papermaking, consisting essentially of obtaining a slurry containing fine particles of hydrous silicic acid by neutralizing sodium silicate with sulfuric acid, and then classifying and pulverizing

TABLE 3

| | (%) Proportion of particles having size of at least 70 μm | (%) Proportion of particles having size of 1 to 30 μm | (μm) Average particle size | (%) Retention of filler | (%) Opacity after printing | (%) Ink transfer ratio | Dislodgement of filler (contamination of plate) |
|---|---|---|---|---|---|---|---|
| Example 5 | | | | | | | |
| Wedge screen | 1.2 | 83 | 7.2 | 46.0 | 92.0 | 52.6 | Not observed |
| Vibrating screen | 3.9 | 81 | 6.9 | 45.3 | 91.8 | 52.8 | Not observed |
| Liquid cyclon | 9.6 | 80 | 7.6 | 45.2 | 91.7 | 52.6 | Not observed |
| Example 6 | | | | | | | |
| Sand grinder A | 1.5 | 81 | 6.0 | 45.5 | 92.0 | 53.0 | Not observed |
| Sand grinder B | 0.7 | 85 | 5.3 | 45.2 | 91.8 | 52.8 | Not observed |
| Sand grinder C | 0.2 | 84 | 4.9 | 45.0 | 91.6 | 52.7 | Not observed |
| Sand grinder D | 0.05 | 80.4 | 4.2 | 45.1 | 91.6 | 52.6 | Not observed |
| Commercially available product | 0.5 | 82 | 6.0 | 44.7 | 91.3 | 51.4 | Very slight |
| Blank | — | — | — | — | 88.6 | 51.3 | — | said slurry by the combined use of a wet classifier and a wet pulverizer so that the proportion of particles of hydrous silicic acid having a particle size of 1–30 μm is at least 80% and the proportion of particles of hydrous silicic acid having a particle size of at least 70 μm is not more than 0.4%.

8. A process according to claim 7, wherein the proportion of particles having a particle size of at least 70 μm is not more than 0.05%.

9. A process according to claim 7, wherein the average particle size of the resulting filler is in the range of 3 to 10 μm.

10. A process according to claim 7, wherein the slurry is pulverized by a wet pulverizer; the pulverization product is classified into particles (A) having a size not larger than 30 μm and particles (B) having a size larger than 30 μm by a wet classifier; said particles (B) having a size larger than 30 μm are pulverized by the same or a different wet pulverizer to obtain particles (C) predominantly having a size not larger than 30 μm; and the particles (B) and the particles (C) are combined together.

11. A process according to claim 7, wherein the slurry is classified into particles (D) containing a salient amount of particles having a size of at least 70 μm, and particles (E) substantially not containing particles having a size of at least 70 μm, by a wet classifier; the particles (D) are pulverized by a wet pulverizer and then classified by the same or a different wet classifier to obtain particles (F) having a size not larger than 30 μm; and the particles (E) and the particles (F) are combined together.

* * * * *